(12) United States Patent
Shen

(10) Patent No.: US 9,085,108 B2
(45) Date of Patent: Jul. 21, 2015

(54) FILM ADHERING MECHANISM

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Chao Shen, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 80 days.

(21) Appl. No.: 14/060,853

(22) Filed: Oct. 23, 2013

(65) Prior Publication Data

US 2014/0174668 A1    Jun. 26, 2014

(30) Foreign Application Priority Data

Dec. 24, 2012  (CN) ....................... 2012 2 0718520 U

(51) Int. Cl.
- *B32B 37/00*    (2006.01)
- *B29C 63/00*    (2006.01)
- *B29C 63/02*    (2006.01)

(52) U.S. Cl.
CPC .............. *B29C 63/0004* (2013.01); *B29C 63/02* (2013.01); *B29C 63/0047* (2013.01); *B29C 2791/006* (2013.01)

(58) Field of Classification Search
CPC  B32B 30/10; B32B 37/1009; B32B 37/1018; B29C 63/0004; B29C 63/02
USPC ............................... 156/228, 580, 581, 583.1
See application file for complete search history.

(56) References Cited

U.S. PATENT DOCUMENTS

| | | | |
|---|---|---|---|
| 8,539,908 B2* | 9/2013 | Takagi | 118/696 |
| 2007/0209588 A1* | 9/2007 | Li | 118/715 |
| 2010/0221895 A1* | 9/2010 | Seino et al. | 438/478 |

\* cited by examiner

*Primary Examiner* — James Sells
(74) *Attorney, Agent, or Firm* — Novak Druce Connolly Bove + Quigg LLP

(57) ABSTRACT

A film adhering mechanism includes a base, a film adsorbing platform, at least two flexible members, a vacuum generator; and an electromagnetic valve. The film adsorbing platform includes a main body positioned on the base, and a protective pad covered on the main body away from the base. The at least two flexible members are separately mounted on the base, and pass through the main body and the protective pad, and protrude from the protective pad. A gas inlet and a first adsorbing hole communicating with the gas inlet are defined in the main body. A second adsorbing hole is defined in the protective pad communicating with the first adsorbing hole. The vacuum generator communicates with the gas inlet, and the electromagnetic valve controls the vacuum generator.

14 Claims, 2 Drawing Sheets

FILM ADHERING MECHANISM

BACKGROUND

1. Technical Field

The present disclosure generally relates to adhering mechanisms, and particularly to an adhering mechanism for adhering a protective film to workpieces.

2. Description of the Related Art

A contacting surface of a metallic or plastic workpiece contacting a fixing device can easily damage without protection during a machining process, because of scrap remaining in the fixing device. A protective film is typically adhered to the contacting surface manually to protect the contacting surface from damage. However, air bubbles produced and uneven application of the film manually adversely affects machining quality.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
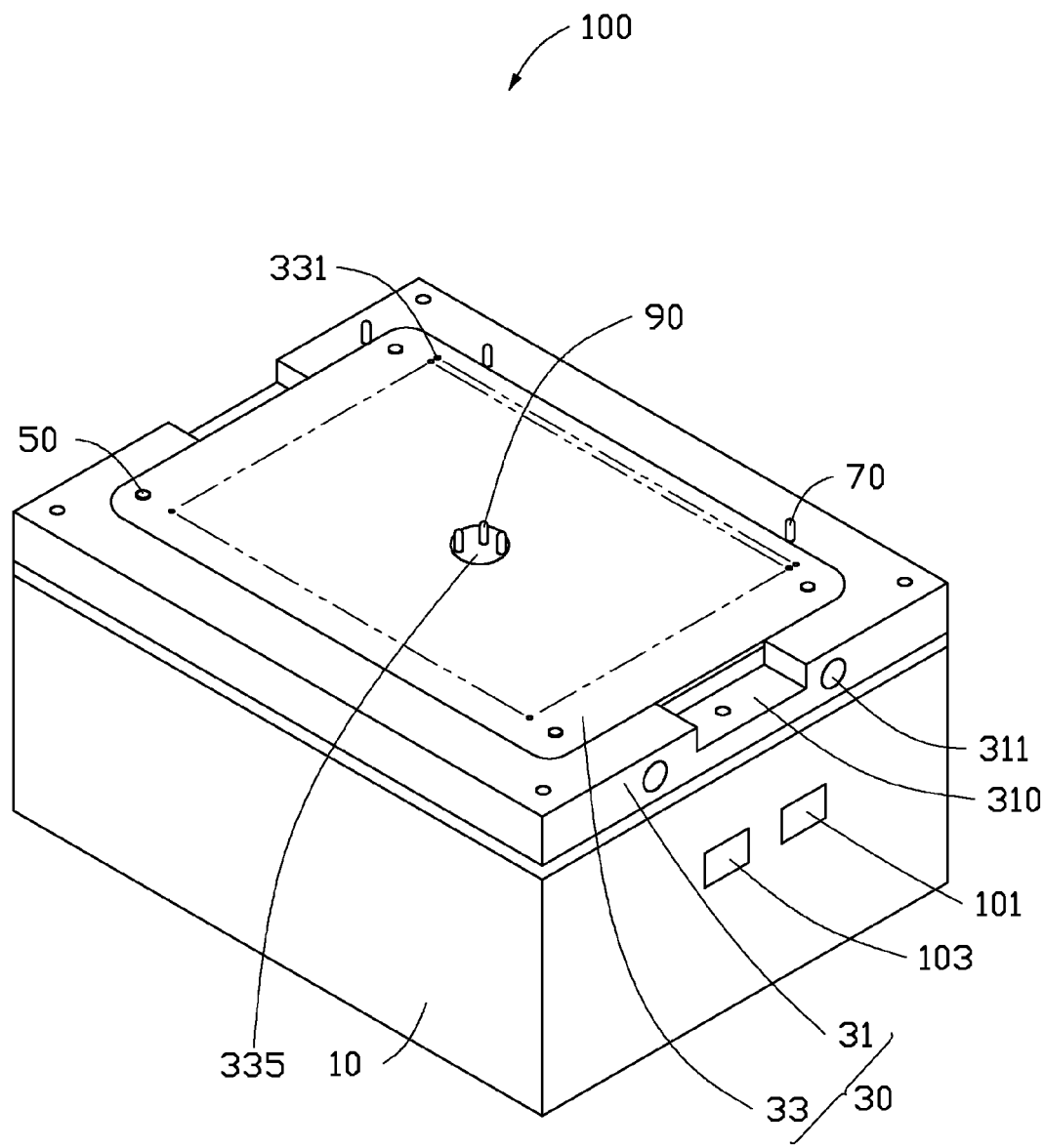
FIG. 1 shows an assembled, isometric view of an embodiment of a film adhering mechanism.
Figure 2:
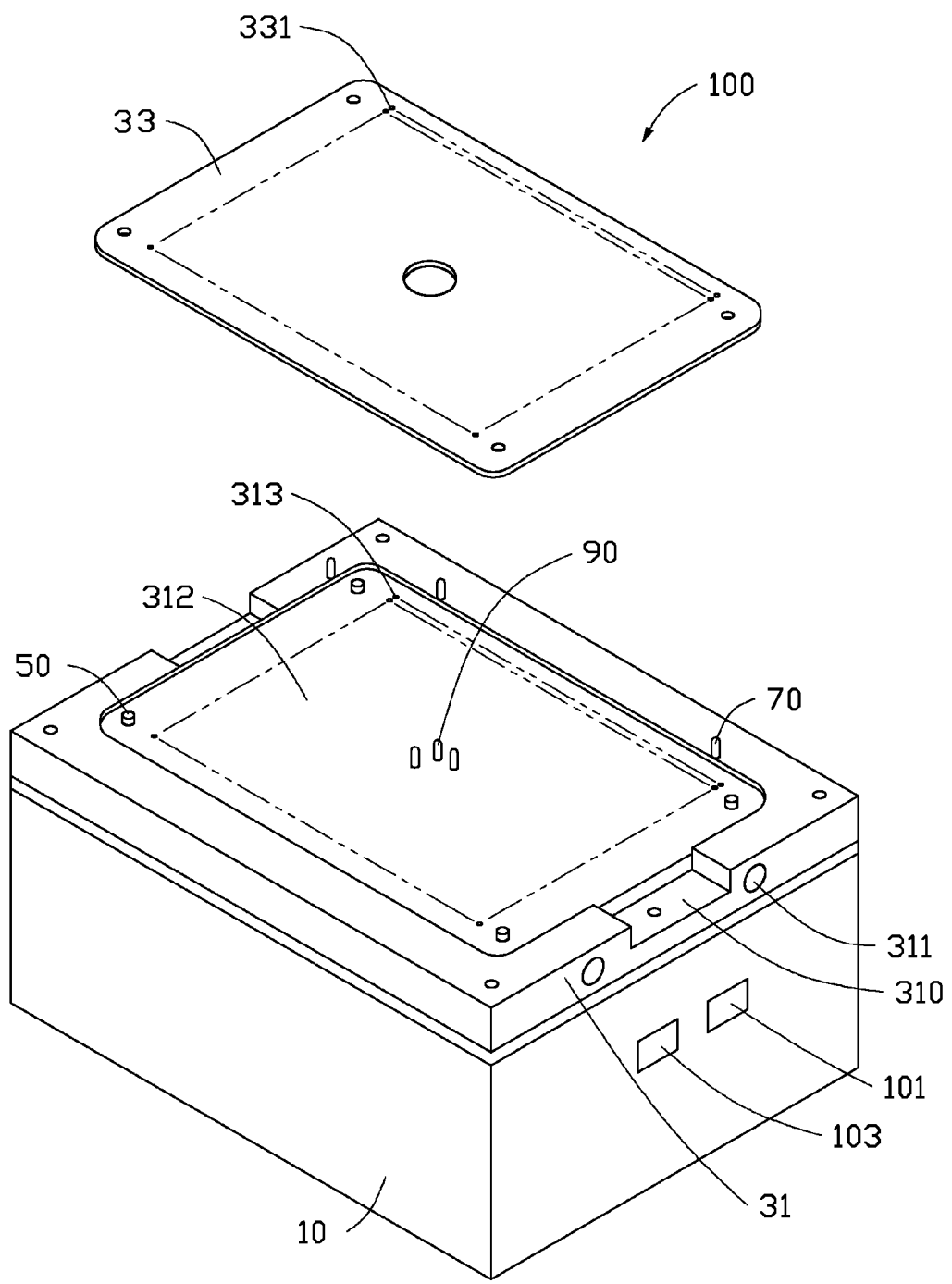
FIG. 2 shows a partial, exploded view of the film adhering mechanism of FIG. 1.

FIGS. 1 and 2 show a film adhering mechanism 100 for adhering a protective film (not shown) to a workpiece (not shown). The film adhering mechanism 100 includes a base 10, a film adsorbing platform 30, four flexible members 50, a plurality of positioning members 70, a plurality of guide members 90, a vacuum generator 101, and an electromagnetic valve 103. The base 10 is a substantially hollow rectangular box. The film adsorbing platform 30 is mounted on the base 10. The four flexible members 50 are positioned on the base 10, and pass through and protrude from the film adsorbing platform 30. The plurality of positioning members 70 is installed on the film adsorbing platform 30. The plurality of guide members 90 is mounted on and protrudes from a central portion of the film adsorbing platform 30. The vacuum generator 101 is positioned on the base 10 and communicates with the film adsorbing platform 30. The electromagnetic valve 103 is positioned on the base 10 for controlling the vacuum generator 101 generate vacuum to assist adhering a protective film on the workpiece.

The film adsorbing platform 30 is substantially rectangular and includes a main body 31 and a protective pad 33 partly covered on the main body 31. The main body 31 is mounted on the base 10. Two mounting grooves 310 are defined in opposite sidewalls of the main body 31 and are located away from the base 10 for conveniently loading or unloading the workpiece. Two gas inlets 311 are defined in the main body 31 adjacent to opposite ends of each mounting groove 310. A substantial receiving groove 312 is defined in the main body 31. A plurality of first adsorbing holes 313 is defined in a bottom wall of the receiving groove 312 and communicates with the gas inlet 311. The protective pad 33 is received in the receiving groove 312. A plurality of second adsorbing holes 331 is uniformly defined though the protective pad 33 and communicates with the gas inlet 311. A through hole 335 is defined in a substantial center of the protective pad 33. The protective pad 33 is made of pliable material for protecting the workpiece in a film adhering process.

In the illustrated embodiment, the main body 31 is a substantially rectangular hollow box. The first adsorbing holes 313 are uniformly formed in the main body 31. Each of the second adsorbing holes 331 corresponds to one first adsorbing hole 313. In one embodiment, the main body 31 can be solid, and several gas passages are formed in the main body 31 to communicate with the gas inlets 311 and the first adsorbing holes 313. In other embodiments, the first adsorbing holes 313 can be other shapes. In one embodiment, only one large first adsorbing hole 313 is formed in the main body 31, and the protective pad 33 covers the first adsorbing hole 313.

Each flexible member 50 is mounted on one corner of the base 10, and substantially protrudes from the main body 31 and the protective pad 33. The flexible members 50 are used for positioning the protective film. In the illustrated embodiment, the flexible members 50 are made of pliable material which can stop scraping the workpiece.

The plurality of positioning members 70 is installed on the main body 31 along edges of the protective pad 33. The plurality of guide members 90 is mounted on the central portion of the bottom wall of the receiving groove 313 and passes through the through hole 335 to resist against a sidewall of the through hole 335. The positioning members 70 and the guide members 90 are used for positioning the protective film and the workpiece. In the illustrated embodiment, the positioning members 70 and the guide members 90 are made of pliable material to prevent damage to the protective film and the workpiece.

The protective film is adhered to a centrifugal paper (not shown) to prevent contamination before use. In the illustrated embodiment, a hole is defined in the workpiece corresponding to the through hole 335. Four positioning holes (not shown) are defined in the protective film and the centrifugal paper.

In use, the protective film and the centrifugal paper away from the film adsorbing platform 30 are positioned on the film adsorbing platform 30. The electromagnetic valve 103 controls the vacuum generator 101 to generate a vacuum to suck the protective film. The centrifugal paper is torn off by external force. The workpiece is put on the protective film. Force is applied to the workpiece, the flexible member 50 is compressed, and the protective film is adhered to the workpiece. The vacuum generator 101 stops generating the vacuum so that the workpiece can be removed.

The protective film is evenly and quickly adhered to the workpiece with the assistance of the film adhering mechanism 100. Any air bubbles produced during the film labeling process are eliminated because the protective film is first adsorbed on the film adsorbing platform 30 with a vacuum generator 101. The film labeling progress also reduces time.

In other embodiments, the protective pad 30 can protrude from the main body 31, or received in a received groove defined in the main body 31.

In other embodiments, the number and the positions of the flexible members 50 can be changed, the positioning members 70 and the guide members 90 can be omitted, the flexible members 50 can be omitted, the guide members 90 can be omitted when the workpiece lack a center hole or positioned by flexible members, and/or the vacuum generator 101 and the electromagnetic valve 103 can be positioned on other objects, such as the main body 31.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A film adhering mechanism comprising:
a base;
a film adsorbing platform comprising a main body positioned on the base and a protective pad placed on the main body away from the base;
at least two flexible members separately mounted on the base, passing through the main body and the protective pad, and protruding from the protective pad;
a vacuum generator; and
an electromagnetic valve, wherein a gas inlet and a first adsorbing hole communicating with the gas inlet are defined in the main body, a second adsorbing hole is defined in the protective pad communicating with the first adsorbing hole, the vacuum generator communicates with the gas inlet, and the electromagnetic valve controls the vacuum generator.

2. The film adhering mechanism of claim 1, further comprising at least one guide member positioned on the main body, wherein a through hole is defined in the protective pad, and the at least one guide member protrudes through the through hole.

3. The film adhering mechanism of claim 2, wherein the at least one guide member resists against a sidewall of the through hole.

4. The film adhering mechanism of claim 1, wherein a receiving groove is defined in the main body, and the protective pad is received in the receiving groove.

5. The film adhering mechanism of claim 1, wherein two mounting grooves are defined in opposite sidewalls of the main body.

6. A film adhering mechanism comprising:
a base;
a film adsorbing platform comprising a main body positioned on the base and a protective pad covered on the main body away from the base;
at least one positioning member positioned on the main body along an edge of the protective pad;
a vacuum generator; and
an electromagnetic valve, wherein a gas inlet and a first adsorbing hole communicating with the gas inlet are defined in the main body, a second adsorbing hole is defined in the protective pad communicating with the first adsorbing hole, the vacuum generator communicates with the gas inlet, and the electromagnetic valve controls the vacuum generator.

7. The film adhering mechanism of claim 6, further comprising at least one guide member positioned on the main body, wherein a through hole is defined in the protective pad, and the at least one guide member protrudes through the through hole for guiding and positioning.

8. The film adhering mechanism of claim 7, wherein the at least one guide member resists against a sidewall of the through hole.

9. The film adhering mechanism of claim 7, wherein a receiving groove is defined in the main body, and the protective pad is received in the receiving groove.

10. The film adhering mechanism of claim 6, wherein two mounting grooves are defined in opposite sidewalls of the main body.

11. A film adhering mechanism comprising:
a base;
a film adsorbing platform comprising a main body positioned on the base and a protective pad covered on the main body away from the base, the protective pad defining a through hole;
at least one guide member positioned on the main body and passing through the through hole;
a vacuum generator; and
an electromagnetic valve, wherein a gas inlet and a first adsorbing hole communicating with the gas inlet are defined in the main body, a second adsorbing hole is defined in the protective pad communicating with the first adsorbing hole, the vacuum generator communicates with the gas inlet, and the electromagnetic valve controls the vacuum generator.

12. The film adhering mechanism of claim 11, further comprising at least two flexible members separately mounted on the base, passing through the main body and the protective pad, and protruding from the protective pad.

13. The film adhering mechanism of claim 11, wherein two mounting grooves are defined in opposite sidewalls of the main body.

14. The film adhering mechanism of claim 11, wherein a receiving groove is defined in the main body, and the protective pad is received in the receiving groove.

* * * * *